United States Patent [19]

Lahary et al.

[11] Patent Number: 5,336,754
[45] Date of Patent: Aug. 9, 1994

[54] PREPARATION OF AMORPHOUS/SEMICRYSTALLINE SEMI-AROMATIC (CO)POLYAMIDES

[75] Inventors: Pierre-Yves Lahary, Lyons; Serge Roy, Charly, both of France

[73] Assignee: Rhone-Poulenc Chimie, Courbevoie, France

[21] Appl. No.: 572

[22] Filed: Jan. 4, 1993

Related U.S. Application Data

[60] Continuation of Ser. No. 808,239, Dec. 16, 1991, abandoned, which is a division of Ser. No. 482,509, Feb. 21, 1990, Pat. No. 5,109,106.

[30] Foreign Application Priority Data

Feb. 21, 1989 [FR] France ................. 89 02467

[51] Int. Cl.$^5$ ............................. C08G 69/28
[52] U.S. Cl. ................... 528/349; 528/313; 528/336

[58] Field of Search .............. 528/336, 313, 349

[56] References Cited

U.S. PATENT DOCUMENTS 5,109,106  4/1992  Lahary et al. ................. 528/336

Primary Examiner—John Kight, III
Assistant Examiner—P. Hampton-Hightower
Attorney, Agent, or Firm—Burns, Doane, Swecker & Mathis

[57] ABSTRACT

Amorphous or semicrystalline semi-aromatic copolyamides are prepared, with significantly reduced loss of amino reactant, by polycondensing an acidic monomer which includes at least one aromatic dicarboxylic acid having from 8 to 18 carbon atoms with an amino comonomer consisting essentially of an alkylpentamethylenediamine, or salt thereof, wherein said polycondensation is carried out in a closed reaction zone.

4 Claims, No Drawings

PREPARATION OF AMORPHOUS/SEMICRYSTALLINE SEMI-AROMATIC (CO)POLYAMIDES

This application is a continuation of application Ser. No. 07/808,239, filed Dec. 16, 1991 now abandoned, which is a divisional of application Ser. No. 07/482,509, filed Feb. 21, 1990, now U.S. Pat. No. 5,109,106.

BACKGROUND OF THE INVENTION

1. Field of the Invention:

The present invention relates to the preparation of amorphous or semicrystalline semi-aromatic (co)polyamides from an acidic monomer comprising at least one aromatic dicarboxylic acid having from 8 to 18 carbon atoms and from an amino comonomer predominantly comprising an alkylpentamethylenediamine.

2. Description of the Prior Art:

Polyamides prepared from aliphatic diamines and from aromatic dicarboxylic acids have long been known to this art. Depending on their composition, these polyamides are: either semicrystalline polymers which have a high glass transition temperature $T_g$, generally above 120° C., and a melting temperature $T_m$ well above 300° C., which is not compatible with facile melt-processing; or amorphous polymers which combine a $T_g$ which frequently exhibits medium values of 100° C. to 120° C. with a processing temperature which is not excessively high, on the order of 200° to 290° C. The semicrystalline polyamides are advantageously employed when it is intended, for example, to manufacture shaped articles which exhibit an excellent dimensional stability and an excellent retention of mechanical properties at high temperatures, as a result of the high value of the $T_g$ of the polymer employed. The amorphous polyamides are advantageously employed in fields which require, for example, an excellent transparency in the case of the fabricated shaped articles.

Semicrystalline polyamides of particular interest are those prepared from 2-methyl-1,5-pentamethylenediamine and terephthalic acid (cf. JP-A-69/019,551) because of the possibility of providing a $T_g$ on the order of 142° C., while having a $T_m$ which remains below 290° C. This permits the polymer to be processed according to the usual techniques employed for the conversion of polyamide 66. Amorphous polyamides of particular interest are those also prepared from 2-methylpentamethylenediamine, but reacted with a mixture of terephthalic acid and of isophthalic acid (15 to 30 mol % in the mixture of the diacids) (cf. FR-A-2,325,673). These latter polymers offer the possibility of providing a $T_g$ value which is high for an amorphous polymer and which, here again, can be as high as 142° C.

A convenient operating procedure for preparing these semi-aromatic polyamides of particular interest entails the conventional polycondensation process used to prepare nylon 66, carried out in liquid phase or in the melt. According to this process, the polycondensation is carried out starting with compositions which either contain stoichiometric or essentially stoichiometric amounts of diamine and of diacid, or contain their salt, the operation being carried out in a closed system of the autoclave type, optionally in the presence of water and wherein the following stages are conducted in sequence:

(a) Stage 1: in which, with the autoclave closed, the temperature of the starting composition is progressively increased up to a value ranging from 200° C. to 240° C.; then, at a constant pressure equal to the autogenous steam pressure obtained, which, for example, ranges from 1.5 to 2.5 MPa when the starting composition contains water, removing the water present in the reaction mass by steady distillation by simultaneously progressively increasing the temperature of the mass to a value in the range of from 245° to 280° C.;

(b) Stage 2: in which the pressure is progressively decreased from the value of the autogenous pressure to the value of the atmospheric pressure and, simultaneously, the temperature of the reaction mass is optionally increased to a value which is some ten to several tens of degrees centigrade higher than the temperature attained before decompression, while ensuring a steady distillation of water during this decompression period; and (c) Stage 3: in which the polycondensation is completed by stirring the reaction mass for a certain period of time, the operation being carried out at atmospheric pressure and optionally (or) at a lower pressure with a mass temperature equal to or higher than the temperature attained at the end of Stage 2, until the point in time when the polyamide has attained the desired molecular and viscosity characteristics.

However, carrying out such a conventional polycondensation process is not free from disadvantages when the starting amino comonomer is an alkylpentamethylenediamine such as 2-methyl-1,5-pentamethylenediamine because of the development of interfering reactions involving this diamine. 2-Methyl-1,5-pentamethylenediamine is a compound which cyclizes readily; when involving the free diamine, this cyclization produces 3-methyl piperidine (a product designated hereinafter by the expression: "free cyclic amine") with a release of ammonia $NH_3$ and, when it entails the diamine participating in the amidification reactions via only one of its functional groups, it serves as a chain-limiting mechanism, producing blocking groups of the formula:

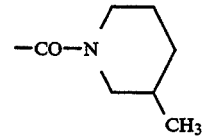

also with release of ammonia. The free cyclic amine formed is recovered during Stages 1 and 2 at the time when water is removed by distillation at constant pressure (Stage 1) and then during the decompression (Stage 2). Another interfering reaction includes the loss of the amino reactant (2-methylpentamethylenediamine) by entrainment, which takes place essentially completely during Stages 1 and 2 at the time of the removal of the water present by distillation at constant pressure (Stage 1) and then during the decompression (Stage 2). The result of these interfering reactions, therefore, presents two disadvantages:

(i) on the one hand, a high loss of total basicity, which is equal to at least 4.5%, involving, first, a departure from stoichiometry during the polycondensation between the primary amino groups and the carboxyl groups which react, consequently preventing the likelihood of readily increasing the molecular weight of the polyamide being formed and, secondly, an actual difficulty in reproducing the process on an industrial scale.

The loss in total basicity described above is established in relation to the total amount of amino reactant introduced and is expressed by the equation:

$$\frac{\text{basicity lost}}{\text{basicity introduced}} \times 100, \text{ in which:}$$

the expression "basicity lost" corresponds to the sum: number of NH$_2$ equivalents of amino reactant which is lost during distillation+number of NH equivalents of free cyclic amine+number of NH$_2$ equivalents of ammonia. This lost basicity is measured directly, using potentiometric determination, on the distillates, i.e., on all of the water condensed during the distillation stages at constant autogenous pressure and during the decompression. It is possible to measure the number of NH equivalents of free cyclic amine alone, again using a potentiometric determination, by performing the operation on the distillates, but after they have been treated such as to differentiate between the free cyclic amine and other basicities (amino reactant and ammonia);

the expression "basicity introduced" corresponds to the number of NH$_2$ equivalents of the amino comonomer introduced. The expression "number of" primary or secondary amino "equivalents" of a compound connotes the number of primary or secondary amino groups present in one mole of said compound; for example, 1 mole of amino reactant consisting of 2-methylpentamethylenediamine contains 2 primary amino NH$_2$ equivalents, whereas one mole of cyclic amine consisting of 3-methylpiperidine contains one secondary amino NH equivalent; and (ii) on the other hand, the existence in the polycondensation mixture of a high proportion of end groups of the cyclic amine type, which serve as a chain-limiter and can restrict the access to high molecular masses. It should be noted that this second disadvantage is less awkward than the first, relating to the loss in total basicity.

Overall, the above disadvantages associated with the use of an amino reactant such as an alkylpentamethylenediamine, capable of being readily entrained by distillation and cyclized by a reaction that produces products which are useless in the polycondensation, make it impossible to carry out the conventional process used to prepare nylon 66.

SUMMARY OF THE INVENTION

Accordingly, a major object of the present invention is the provision of an improved process for the preparation of amorphous or semicrystalline semi-aromatic polyamides from an amino reactant predominantly comprising an alkylpentamethylenediamine, in particular 2-methyl-1,5-pentamethylenediamine, which improved process is of modified nylon 66 type and which reduces the competing reactions to date characterizing the state of this art such that, in particular, any loss in total basicity is decreased to values of less than 4%.

Briefly, the present invention features a process for the preparation of amorphous or semicrystalline semi-aromatic (co)polyamides, comprising polycondensing either an acidic reactant containing at least one aromatic dicarboxylic acid having 8 to 18 carbon atoms and an amino reactant essentially consisting of an alkylpentamethylenediamine, or salt thereof, with the polymerization being carried out in a closed system of the autoclave type in the following sequence of stages:

(a) Stage 1: in which, the autoclave being closed, the temperature of the starting composition is progressively increased to a certain value T1 above 110° C.; then, at a constant pressure P equal to the autogenous steam pressure attained which is higher than atmospheric pressure, the water present in the reaction mass is removed by steady distillation while the temperature of the reaction mass is simultaneously progressively increased to a value T2 which is higher than the temperature T1 attained before distillation;

(b) Stage 2: in which the pressure is progressively decreased from the value of the autogenous pressure to the value of the atmospheric pressure and the temperature of the mass is simultaneously optionally increased to a value T3 which is higher by some ten to several tens of degrees centigrade than the temperature T2 attained before decompression, while continuously ensuring a steady distillation of water during this decompression period; and (c) Stage 3: in which the polycondensation is completed by stirring the reaction mass for a certain period of time, the operation being carried out at atmospheric pressure and optionally (or) at a lower pressure with a mass temperature equal to or higher than the temperature T2 or T3 attained at the end of Stage 2, for a sufficient period of time to produce a polyamide having the desired molecular and viscosity characteristics; and wherein such polycondensation:

(d) the starting material composition, on the one hand, additionally necessarily contains water in sufficient amount to permit the distillation of Stage 1 to be conducted under the particular conditions of temperatures (T1 and T2) and of pressure (P) which are indicated below and, on the other hand, additionally, but optionally, contains a catalyst; and (e) in Stage 1, after the autoclave has been closed, the temperature of the starting composition is progressively increased to a value T1 ranging from 160° C. to 190° C.; then, at a constant pressure P equal to the autogenous steam pressure attained, which ranges from 0.5 to 1.2 MPa, the water present in the reaction mass is removed by steady distillation by simultaneously progressively increasing the temperature of the reaction mass to a value T2 ranging from 210° C. to 235° C.

DETAILED DESCRIPTION OF THE PREFERRED EMBODIMENTS OF THE INVENTION

More particularly according to the present invention, the subject process carl be carried out using either stoichiometric amounts of an acidic reactant and of an amino reactant contributing equivalent numbers of COOH and NH$_2$ groups, or the stoichiometric salt(s) thereof.

It may prove advantageous to introduce amounts of amino reactant which are greater than those precisely required to establish the equivalence between the COOH and NH$_2$ groups in the starting compositions, such as to introduce into the reaction mass an excess of diamine(s) which makes it possible to compensate for the loss of this reactant which occurs during the operation of distillation at constant autogenous pressure (Stage 1), and then during the decompression operation (Stage 2). According to this preferred embodiment, the excess of amino reactant, expressed as the molar percentage of excess amino reactant according to the relationship:

$$\frac{\text{total number of moles of amino reactant} - \text{number of moles of amino reactant required for stoichiometry}}{\text{number of moles of amino reactant required for stoichiometry}} \times 100$$

typically ranges from 0.5 to 7% and, preferably, from 1 to 5%.

Starting compositions prepared from:

(i) acidic reactant: terephthalic acid and/or isophthalic acid;

(ii) amino reactant: 2-methyl-1,4-pentamethylene-diamine, either alone or mixed with not more than 15 mol % of 2-ethyl-1,4-tetramethylenediamine, are well suited for carrying out the process according to the present invention. To prepare amorphous semi-aromatic polyamides, an acidic reactant comprising a mixture of terephthalic acid with at least 10 mol % (in the mixture of the two acids) of isophthalic acid is advantageously employed. To prepare semicrystalline semi-aromatic polyamides, a reactant solely comprising terephthalic acid is advantageously employed. The synthesis of the 2-methylpentamethylenediamine starting material can be performed by hydrogenation of the dinitrile of 2-methyl glutaric acid according to processes well known to this art. Similarly, the synthesis of 2-ethyltetramethylenediamine can be performed by hydrogenation of the dinitrile of 2-ethylsuccinic acid.

The process according to the present invention will now be described in greater detail.

The expression "water present in the reaction mass" (which appears above in Stage 1 concerning the distillations) is intended to define the water contained in the starting compositions plus the water which may be formed by the polycondensation of the acidic monomer and the amino comonomer. The amount of water contained in the starting compositions is not critical, provided it makes it possible to conduct the distillation of Stage 1 under the particular conditions of temperatures (T1 and T2) and of autogenous pressure (P) indicated above; this amount of water can easily be determined by one skilled in this art.

To carry out Stage 1 of the process according to the invention, it is possible to introduce into the reactor starting compositions which are in the form of mixtures: either based on the acidic reactant, the amino reactant, water and optionally on the catalyst, the acidic reactant being employed in the solid state and the amino reactant being employed, for example, in the state in which it is found naturally, or in the form of an aqueous solution; or based on the salt(s) of diacid(s) and of diamine(s), water and optionally on the catalyst, the salt(s) being employed, for example, in the solid state, in aqueous dispersion, or in the form of an aqueous solution thereof.

In a preferred embodiment of Stage 1, starting compositions are employed which are in the form of an aqueous dispersion or of an aqueous solution of salt(s) derived from diacid(s) and from diamine(s), optionally additionally containing a catalyst, in which the amount of water employed is advantageously equal to that which corresponds to the water contained in the starting compositions. To provide the stoichiometry and optionally the desired excess of the stoichiometry by adding diamine(s) in the production of the salt(s), the operation is carried out by precise weighing of the reactants whose strength is perfectly known at the time of use; it is preferable to subsequently monitor this stoichiometry by measuring the pH of sample solutions obtained by diluting the salt(s) in a suitable solvent such as, for example, water.

When the process according to the present invention is carried out using the suitable starting compositions described above, namely, those prepared from an acidic reactant based on terephthalic acid and/or isophthalic acid and from an amino reactant based on 2-methylpentamethylenediamine and optionally 2-ethyltetramethylenediamine, the aqueous dispersion or the aqueous solution of salt(s) which is used has a water content whose lower limit ranges from 25 to 31% by weight, relative to the total amount of salt(s)+water, depending on the nature of the acidic reactant (maximum concentration of salt(s) ranging from 69 to 75% by weight). With regard to the upper limit of the water content, this is generally equal to 50% by weight (minimum 50% salt(s) concentration). It is apparent, in the case where the aqueous dispersion or the aqueous solution of salt(s) has a water content which must be lowered, especially when it is higher than 50% by weight, that a concentration of the starting composition can be conducted in a first step, before beginning Stage 1, for example by evaporating the water off at atmospheric pressure or at a pressure slightly above atmospheric pressure and under low temperature conditions which absolutely do not permit the development of amidification reactions and/or of the interfering competing reactions discussed above.

With regard to the catalyst which may be employed, this generally is either a compound ($\alpha$) or a compound ($\beta$), ($\alpha$) denoting an inorganic oxygenated mono- or polyacid or an organic oxygenated mono- or polyacid other than a carboxylic acid, in which at least one of the acidic functional groups has an ionization constant $pK_a$ equal to or less than 4 in water at 25° C., ($\beta$) denoting an alkali or alkaline earth metal salt of this acid.

Exemplary of the strong acids which are suitable, the following are representative:

(i) among the inorganic oxyacids, sulfurous, sulfuric, hypophosphorous, phosphorous, orthophosphoric or pyrophosphoric acids;

(ii) among organic oxyacids:

organosulfonic acids of the formula $R_1$—$SO_3H$ (I) in which $R_1$ is a linear or branched chain alkyl radical having from 1 to 6 carbon atoms, a phenyl radical optionally substituted by 1 to 3 alkyl radicals having from 1 to 3 carbon atoms, a phenylalkyl radical having from 1 to 3 carbon atoms in the alkyl moiety and whose benzene nucleus may be optionally substituted by 1 to 3 alkyl radicals having from 1 to 3 carbon atoms, or a naphthyl radical optionally substituted by 1 to 4 alkyl radicals having from 1 to 3 carbon atoms;

organophosphonic acids of the formula $R_2$—$P(O)(OH)_2$ (II) in which $R_2$ is an alkyl radical, a phenyl radical or a phenylalkyl radical, with such radicals being as defined above for R1;

organophosphinic acids of the formula $R_3R_4$—$P(O)(OH)$ (III) in which each of $R_3$ and $R_4$, which may be identical or different, is a linear alkyl radical having from 1 to 3 carbon atoms, a phenyl radical or a phenylalkyl radical, with each of these latter two radicals being as defined above for $R_1$;

organophosphonous acids of the formula $R_5$—H—P(O)(OH) (IV) in which $R_5$ is a linear or branched chain alkyl radical having from 1 to 4 carbon atoms (branching being excluded in the case of an alkyl radical having 4 carbon atoms), a phenyl radical or a phenylalkyl radical, each of these latter two radicals being as defined above for $R_1$.

As the strong acid ($\alpha$), it is preferred to use the acids derived from phosphorus and more particularly hypophosphorous, phosphorous, orthophosphoric, pyrophosphoric, methylphosphonic, phenylphosphonic, benzylphosphonic, dimethylphosphinic, diphenylphosphinic, methylphenylphosphinic, dibenzylphosphinic, methylphosphonous, phenylphosphonous or benzylphosphonous acids.

With regard to the acid salt ($\beta$), an alkali metal or alkaline earth metal salt derived from the inorganic or organic oxyacids ($\alpha$) is advantageously used.

As the salt ($\beta$), it is preferred to use those which are completely soluble in the reaction mixture. Among these preferred salts ($\beta$), those which are especially suitable are the sodium and potassium salts derived from the particular types of inorganic or organic oxyacids ($\alpha$) which are useful, referred to above. Salts ($\beta$) which are very particularly useful are the sodium and potassium salts derived from the preferred phosphorous-derived acids named above.

The proportions of strong acid ($\alpha$) or of salt ($\beta$), expressed as a percentage by weight relative to the final polyamide, generally range from 0.01 to 1% and preferably from 0.01 to 0.5%.

With respect to the operation of Stage 1 of the process according to the present invention, it should be appreciated that the progressive heating of the starting composition up to the temperature T1 can be carried out over a period of time ranging, for example, from 10 minutes to 2 hours. As for the distillation under constant autogenous pressure P, this is carried out over a period of time ranging, for example, from 30 minutes to 3 hours, 30 minutes.

In the operation of Stage 1, it will be preferred to conduct the distillation at a constant autogenous pressure P ranging from 0.6 to 1 MPa by selecting: a temperature T1 at the start of distillation ranging from 170° C. to 185° C. and a temperature T2 immediately prior to decompression ranging from 215° C. to 230° C.

In the operation of Stage 2, the decompression, which may progress in successive plateaus, is carried out over a period of time ranging, for example, from 20 minutes to 2 hours, 30 minutes and the temperature of the reaction mass is simultaneously increased to a value T3 ranging, for example, from 250° C. to 320° C.

In the operation of Stage 3, the polycondensation is finished by permitting the reaction mass to react at the temperature T3 or at a temperature which may be higher than T3 by a few degrees to about ten degrees, preferably while operating at a reduced pressure in the range of from $1 \times 10^2$ to $1,000 \times 10^2$ Pa for a period of time (including the time for reducing pressure) ranging, for example, from 10 minutes to 3 hours.

Strict observance of the operating conditions described above and, in particular, observance of the conditions of temperatures (especially those concerning T1) and of pressure (P) which govern the distillation at constant pressure in Stage 1, is essential in order to maintain the loss in total basicity at values of less than 4%. It has unexpectedly been found that the loss in basicity increases significantly, to exceed the threshold of 4%, both when the temperature and pressure conditions are above the maximum limits of the ranges indicated, i.e., 190° C. in the case of T1 and 1.2 MPa in the case of P, and when these conditions are below the minimum limits of the ranges indicated, i.e., 160° C. in the case of T1 and 0.5 MPa in the case of P.

It is apparent that the composition of the starting reactants in the process according to the invention may also include various additives which are commonly employed in the preparation of conventional polyamides. These additives may be, in particular, nucleating agents and stabilizers of various kinds.

The process according to the invention permits production of semi-aromatic (co)polyamides which have a viscosity number (measured in meta-cresol at 25° C. on a solution containing 0.5 g of dried polymer in 100 cm³ of solvent) which may be equal to at least 90 ml/g, and this is particularly the case when the polycondensation is carried out according to the preferred embodiment of employing an excess of starting amino reactant; because of the high value of the viscosity characteristics which is obtained, such (co)polyamides can be converted, for example after molding, into shaped articles having good mechanical properties. Furthermore, the (co)polyamides prepared by the process of the invention are distinguished in that, on the one hand, their proportions of end COOH and NH$_2$ groups are essentially correctly balanced (the difference NH$_2$ EG—COOH EG, where NH$_2$ EG denotes the proportion of NH$_2$ end groups and COOH EG denotes the proportion of COOH end groups, being in the range of, for example, from 0 to 80 meq/kg when taken as an absolute value; the determination of the proportions of end groups is carried out as described below) and, on the other hand, their proportion of chain-limiting end groups of the cyclic amine type is low and generally below 40 milligram-equivalents per kilogram of polymer.

The process according to the invention is particularly suited for discontinuous operation. However, it is also within the ambit of the present invention to carry it out in a continuous operation by linking Stage 1 as defined above with a decompression stage and a finishing stage, overall corresponding to Stages 2 and 3 of the process of the invention, but with certain adaptations which are per se known to this art.

In order to further illustrate the present invention and the advantages thereof, the following specific examples are given, it being understood that same are intended only as illustrative and in nowise limitative.

In said examples to follow, a number of controls were carried out. The particular techniques for implementing such controls are described immediately below:

I. DETERMINATION OF THE PROPORTIONS OF COOH AND NH$_2$ END GROUPS (COOH EG AND NH$_2$ EG) IN THE POLYMER

This determination was carried out by potentiometric determination of a solution of polymer in a 70/30 by weight mixture of trifluoroethanol and chloroform using 0.02N trifluoromethanesulfonic acid. The method permitted determination of the COOH and NH$_2$ groups simultaneously by adding a 0.05N solution of tetrabutylammonium hydroxide in nitrobenzene. The results are expressed in milligram-equivalents per kilogram of polymer (meq/kg).

II. DETERMINATION OF METHYLPIPERIDINE IN THE POLYMER

The determination of 3-methylpiperidine (MPP) in the polymer was carried out by gas phase chromatography. The principle of the method was as follows:

(i) the polymer (approximately 250 mg) was first subjected to a hydrochloric hydrolysis (15 hours at 170° C.) and it was then neutralized with sodium hydroxide until its pH was slightly basic;

(ii) the amines were then extracted quantitatively with chloroform (approximately 50 cm$^3$); and (iii) this chloroform extract was finally analyzed by gas phase chromatography and 3-methylpiperidine was determined by the internal standard method (internal standard =nonane). The number of MPP end groups (MPP EG) in the polymer was in this case also expressed in meq/kg.

III. MEASUREMENT OF THE VISCOSITY NUMBER (IV) OF THE POLYMER

This number was determined at 25° C. according to International Standard ISO 307, 1977 edition, using a solution containing 0.5 g of polymer (dried for 2 hours at 60° C. under an argon purge) in 100 cm$^3$ of meta-cresol.

IV. DETERMINATION OF THE BASICITY LOST IN THE DISTILLATES

The measurement of this basicity was carried out by a simple potentiometric determination using HCl in all the water condensed during the distillation stages at constant autogenous pressure (Stage 1) and during the decompression (Stage 2).

V. DETERMINATION OF METHYLPIPERIDINE IN THE DISTILLATES

The proportion of 3-methylpiperidine was obtained by a potentiometric determination of the distillates after specific reaction with salicylaldehyde, which made it possible to differentiate between methylpiperidine and other basicities (2-methylpentamethylenediamine and ammonia).

EXAMPLE 1

This example describes the preparation of an amorphous copolyamide from isophthalic acid (20 mol % in the mixture of diacids), terephthalic acid (80 mol % in the mixture of diacids) and 2-methyl-1,5-pentamethylenediamine with a total basicity loss of 3.1%.

(1) Preparation of the methylpentamethylenediamine salt of (isophthalic+terephthalic) acids in aqueous solution:

The operation was carried out in a 10-liter glass reactor equipped:

(i) with a heating system,
(ii) with an anchor-type stirrer,
(iii) with a system permitting purging of the apparatus with nitrogen and the maintenance of an oxygen-free atmosphere, and
(iv) with a system enabling the volatile products to be condensed.

The following materials were introduced cold into the reactor, which was maintained under a gentle nitrogen purge:

(a) 436.4 g of isophthalic acid (2.6289 moles);
(b) 1,745.5 g of terephthalic acid (10.5151 moles);
(c) 1,524.7 g of 2-methyl-1,5-pentamethylenediamine (13.1440 moles); and
(d) 2,471.1 g of distilled water.

The temperature of the entire mass was increased to 60° C. and the mixture was stirred for 2 hours while the purging with nitrogen was continued. The pH of the salt was then adjusted to 7.48±0.05 by successive additions of small quantities of methylpentamethylenediamine or of a 20/80 mole isophthalic acid/terephthalic acid mixture (pH measured at 20° C. on an aqueous solution containing 10% by weight of salt). An aqueous solution containing 60% by weight of stoichiometric salt was thus obtained.

61 g (0.5258 moles) of methylpentamethylenediamine were then added; the pH then attained a value of 9.27; in this example, a molar excess of 4% of amino reactant was therefore employed.

(2) Polycondensation in an autoclave:

The apparatus employed consisted of a 7.5-liter autoclave made of stainless steel, which was stirred and equipped for operation up to 300° C. and 2.2 MPa in pressure. It was provided:

(i) with a heating jacket system using a heat-transfer fluid;
(ii) with a frame-type stirrer;
(iii) with a system permitting pressurizing with nitrogen;
(iv) with a circuit enabling the volatile products to be condensed and collected; and
(v) a device for applying a pressure which is lower than atmospheric pressure.

6 kg of the aqueous salt solution prepared above were introduced into the autoclave. After 3 nitrogen purges, by pressurizing to $4 \times 10^5$ Pa followed by decompression, the aqueous salt solution was concentrated from 60% by weight to 70.6% by weight over 20 minutes by evaporating off some of the water present in the mixture at atmospheric pressure; the temperature then reached 108.5° C.

Subsequently, the following stages were successively carried out:

Stage 1

The temperature of the aqueous solution containing 70.6% by weight of salt was increased to T1=174° C. over 50 minutes, while an autogenous pressure was maintained. A pressure (P) of 0.7 MPa was then attained. The water present in the reaction mass was then distilled at a constant pressure of 0.7±0.02 MPa for 1 hour, 40 minutes, such as to provide a mass temperature equal to T2=224° C.;

stage 2

Pressure was released to atmospheric pressure over 1 hour and the temperature of the mass was simultaneously raised to the value T3=275° C., while a steady distillation of water continued to be carried out;

Stage 3

A reduced pressure of $750 \times 10^2$ Pa was then progressively established over 30 minutes, while the temperature of the mass was simultaneously increased to 280° C., and the polycondensation was finished by continuing to stir the mass at 280° C. at $750 \times 10^2$ Pa for another 30 minutes.

The stirring was stopped; a nitrogen pressure was then established in the autoclave and the polymer was drawn off. The latter, extruded from the autoclave in the form of a strand, was cooled by passing it through a cold water bath and it was then granulated and dried.

The polymer obtained was transparent and homogeneous. It exhibited the following characteristics:

$NH_2$ = 70 meq/kg,

-continued

COOH EG = 48 meq/kg,
MPP EG = 18 meq/kg,
VN = 111 ml/g.

The material balance of basicity was as follows:
(i) basicity introduced: 26.2936 amino equivalents;
(ii) basicity lost in the distillates: 0.8151 amino equivalents (including 0.2209 amino equivalents in the form of MPP);
(iii) hence, a total basicity loss of 3.1%.

COMPARATIVE EXAMPLE A

In this comparative example, it was shown that, when the temperature T1 at the start of distillation is higher than 190° C. and the constant autogenous pressure P is higher than 1.2 MPa (all the other operating conditions being those described above in Example 1), the polymer which was synthesized was then obtained with a total basicity loss well above the threshold of 4%.

The operation was therefore carried out exactly as set forth in Example 1, with only the following changes being made in respect of the operation of Stage 1.

The temperature T1 at the start of distillation was equal to 217.2° C., the heating time then being 1 hour, 25 minutes, and the autogenous pressure P attained was 1.8 MPa. The water present in the reaction mass was then distilled at a constant pressure of 1.8±0.02 MPa for 1 hour, 40 minutes, and the temperature T2 reached at the end of this time was equal to 231.2° C.

The amorphous polymer obtained exhibited the following characteristics:

$NH_2$ EG = 26 meq/kg,
COOH EG = 205 meq/kg,
MPP EG = 68 meq/kg,
VN = 59.5 ml/g.

The material balance of basicity was as follows:
(i) basicity introduced: 26.2936 amino equivalents;
(ii) basicity lost in the distillates: 1.3410 amino equivalents (including 0.5653 amino equivalents in the form of MPP);
(iii) hence, a total basicity loss of 5.1%.

COMPARATIVE EXAMPLE B:

In this comparative example, it was shown that, when the temperature T1 at the beginning of distillation was below 160° C. and the constant autogenous pressure P was below 0.5 MPa (all the other operating conditions being those described above in Example 1), the polymer which was synthesized was then also obtained with a total basicity loss which was higher than the threshold of 4%.

The operation was therefore carried out exactly according to the procedure of Example 1, with only the following changes being made in respect of the operation of Stage 1.

The temperature T1 at the beginning of distillation was equal to 142.1° C., the heating time then being 40 minutes, and an autogenous pressure P of 0.34±0.03 MPa was attained. The water present in the reaction mass was then distilled at a constant pressure of 0.34 MPa for 3 hours, 30 minutes, and the temperature T2 attained at the end of this time period was equal to 224.5° C.

The amorphous polymer obtained exhibited the following characteristics:

$NH_2$ EG = 20 meq/kg,
COOH EG = 158 meq/kg,
MPP EG = 10 meq/kg,
VN = 79.7 ml/g.

The material balance of basicity was as follows:
(i) basicity introduced: 26.2936 amino equivalents;
(ii) basicity lost in the distillates: 1.2016 amino equivalents (including 0.2209 amino equivalents in the form of MPP);
(iii) hence, a total basicity loss of 4.57%.

EXAMPLE 2

This example describes the preparation of a semicrystalline polyamide from terephthalic acid and 2-methyl-1,5-pentamethylenediamine with a total basicity loss of 2.6%.

(1) Preparation of the terephthalic acid/methylpentamethylenediamine salt in aqueous solution:

The operation was carried out as indicated above in Example 1, but with the following different changes:
(i) 2,295.7 g of terephthalic acid (13.8295 moles);
(ii) 1,604.22 g of 2-methyl-1,5-pentamethylenediamine (13.8295 moles); and
(iii) 2,600 g of distilled water.

Upon completion of salt formation, 64.17 g (0.5532 moles) of methylpentamethylenediamine were added; the pH then attained a value of 9.20 and this additional amount of amino reactant corresponded to a molar excess of 4%. The salt concentration in the aqueous solution was 60% by weight.

(2) Polycondensation in an autoclave:

The operating procedure was the same as that indicated in Example 1, with the following changes:

In respect of Stage 1:

The temperature of the aqueous solution containing 70.6% by weight of salt was increased to T1=184° C. over 1 hour, while an autogenous pressure was maintained. A pressure of 0.85 MPa was then attained. The water present in the reaction mass was then distilled at a constant pressure of 0.85±0.02 MPa for 1 hour, 40 minutes, such as to provide a mass temperature equal to T2=225° C.;

In respect of Stage 2:

The decompression was carried out over two time periods:

(1) decompression down to 0.6 MPa over 1 hour, 30 minutes, while the temperature of the mass was simultaneously increased to 288° C.; and then (2) decompression down to atmospheric pressure over 45 minutes, while the temperature of the mass was simultaneously increased to the value T3=300° C.;

In respect of Stage 3:

The application of a reduced pressure of $750 \times 10^2$ Pa and the final stirring of the mass at reduced pressure were carried out at an unchanged mass temperature equal to 300° C.

The polymer obtained exhibited the following characteristics:

$NH_2$ EG = 92 meq/kg,
COOH EG = 55 meq/kg,
MPP EG = 31 meq/kg,

-continued $$VN = 114 \text{ ml/g}.$$

The material balance of basicity was as follows:
(i) basicity introduced: 26.2934 amino equivalents;
(ii) basicity lost in the distillates: 0.6836 amino equivalents; and
(iii) hence, a total basicity loss of 2.6%.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of an amorphous or semicrystalline semi-aromatic (co)polyamide, comprising polycondensing a starting monomer/comonomer composition comprising an acidic monomer which comprises at least one aromatic dicarboxylic acid having from 8 to 18 carbon atoms with an amino comonomer consisting essentially of an alkylpentamethylenediamine, or salt thereof, in a closed reaction zone and which further comprises:

(a) stage 1: progressively increasing the temperature of the starting monomer/comonomer composition to a certain value T1 above 110° C.; then, at a constant pressure P higher than atmospheric pressure, removing water present in the reaction mass by steady distillation while simultaneously progressively increasing the temperature of the reaction mass to a value T2 which is higher than the temperature T1 attained prior to distillation;

(b) stage 2: progressively decreasing the pressure from such autogenous pressure to atmospheric pressure with or without simultaneously increasing the temperature of the reaction mass to a value T3 which is higher by some ten to several tens of degrees centigrade than the temperature T2 attained prior to decompression, while continuously maintaining said steady distillation of water during said period of decompression;

(c) stage 3: completing the polycondensation by stirring the reaction mass at atmospheric pressure or at a lower pressure with a mass temperature equal to or higher than the temperature T2 or T3 attained at the end of stage 2, for a sufficient period of time as to produce a polyamide having the desired molecular and viscosity characteristics; with the provisos that:

(d) the starting monomer/comonomer composition includes sufficient amount of water as to permit the distillation of stage 1 to be carried out under the particular conditions of temperatures (T1 and T2) and pressure (P) indicated below, and which starting composition comprises a catalyst for polycondensing said starting monomer/comonomer composition; and (e) the temperature of the starting composition in said closed reaction zone is progressively increased in the stage 1 to a value T1 ranging from 160° C. to 190° C.; then, at a constant pressure P equal to the autogenous steam pressure attained, ranging from 0.5 to 1.2 megapascals, removing the water present in the reaction mass by steady distillation by simultaneously progressively increasing the temperature of the reaction mass to a value T2 ranging from 210° C. to 235° C.

2. The process according to claim 1, wherein said catalyst comprises a compound ($\alpha$), or a compound ($\beta$), wherein ($\alpha$) represents an inorganic oxygenated mono- or polyacid or an organic oxygenated mono- or polyacid other than a carboxylic acid, having at least one acidic functional group, in which said at least one acidic functional group has an ionization constant $pK_a$ equal to or lower than 4 in water at 25° C., and ($\beta$) represents an alkali or alkaline earth metal salt of said acid.

3. The process according to claim 2, wherein the proportions of acid ($\alpha$) or of salt ($\beta$) are between 0.01 and 1%, expressed as a percentage by weight relative to the final (co)polyamide.

4. A polyamide produced by the process as defined by claim 1.

* * * * *